United States Patent
Fan et al.

(10) Patent No.: US 12,284,029 B2
(45) Date of Patent: Apr. 22, 2025

(54) SYNCHRONIZATION METHOD, APPARATUS, AND DEVICE, AND STORAGE MEDIUM

(71) Applicant: Huawei Technologies Co., Ltd., Shenzhen (CN)

(72) Inventors: Boling Fan, Dongguan (CN); Xingjian Shi, Beijing (CN); Wei Wu, Wuhan (CN); Xiaoyi Zeng, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 261 days.

(21) Appl. No.: 17/954,651

(22) Filed: Sep. 28, 2022

(65) Prior Publication Data

US 2023/0016860 A1  Jan. 19, 2023

Related U.S. Application Data

(63) Continuation of application No. PCT/CN2020/142162, filed on Dec. 31, 2020.

(30) Foreign Application Priority Data

Mar. 31, 2020 (CN) ......................... 202010247790.9

(51) Int. Cl.
*H04J 3/06* (2006.01)
*H04L 7/02* (2006.01)

(52) U.S. Cl.
CPC .............. *H04J 3/0667* (2013.01); *H04L 7/02* (2013.01)

(58) Field of Classification Search
CPC ................................ H04J 3/0667; H04L 7/02
See application file for complete search history.

(56) References Cited

U.S. PATENT DOCUMENTS 8,300,749 B2 * 10/2012 Hadzic .................. H04J 3/0664
370/503
8,799,918 B2 * 8/2014 Sen ...................... H04L 67/1012
709/224
(Continued)

FOREIGN PATENT DOCUMENTS

| CN | 102111258 A | 6/2011 |
| CN | 103457685 A | 12/2013 |

(Continued)

OTHER PUBLICATIONS

Nokia, et al., "Updates to synchronization solution #11.2," S2-1903649, SA WG2 Meeting #132, Apr. 8-12, 2019, Xian—China, 7 pages.

(Continued)

*Primary Examiner* — Bailor C Hsu
(74) *Attorney, Agent, or Firm* — Conley Rose, P.C.

(57) ABSTRACT

A synchronization method includes obtaining a first timestamp difference of a packet on a target link. The first timestamp difference is a difference between a sending timestamp and a receiving timestamp of the packet at a first moment. The synchronization method further includes performing packet selection based on the first timestamp difference to obtain a second timestamp difference; obtaining a delay prediction value of the target link at the first moment, compensating for the second timestamp difference based on the delay prediction value to obtain a compensated timestamp difference; and performing time and/or clock synchronization based on the compensated timestamp difference. The second timestamp difference is compensated for based on the delay prediction value, that is, PDV noise introduced to the target link is compensated for. In this way, the PDV noise is reduced.

20 Claims, 7 Drawing Sheets

(56) References Cited

U.S. PATENT DOCUMENTS

| | | | |
|---|---|---|---|
| 9,112,631 B2* | 8/2015 | Aweya | H04J 3/0664 |
| 9,444,566 B1 | 9/2016 | Mustiere et al. | |
| 9,485,672 B2* | 11/2016 | Prydekker | H04L 41/0816 |
| 9,722,815 B2* | 8/2017 | Mukundan | H04L 45/24 |
| 9,800,482 B2* | 10/2017 | Pandey | H04L 43/0852 |
| 9,806,876 B2* | 10/2017 | Biederman | H04L 5/0044 |
| 10,565,841 B2* | 2/2020 | Emmanuel | H04W 4/029 |
| 10,911,211 B1* | 2/2021 | Kratz | H04B 17/21 |
| 11,063,738 B1* | 7/2021 | Wang | H04L 7/0008 |
| 11,520,372 B1* | 12/2022 | Wang | G06F 1/12 |
| 11,849,016 B1* | 12/2023 | Wang | H04L 43/0858 |
| 2006/0291479 A1 | 12/2006 | Sasson et al. | |
| 2008/0273521 A1 | 11/2008 | Shao et al. | |
| 2012/0027146 A1 | 2/2012 | Hodge et al. | |
| 2012/0188997 A1 | 7/2012 | Zakrzewski et al. | |
| 2012/0263220 A1 | 10/2012 | Li et al. | |
| 2014/0192826 A1 | 7/2014 | Zampetti | |
| 2017/0141865 A1 | 5/2017 | Ha et al. | |
| 2021/0326726 A1* | 10/2021 | Wang | G06N 3/084 |

FOREIGN PATENT DOCUMENTS

| | | | |
|---|---|---|---|
| CN | 108337032 A | 7/2018 | |
| CN | 110636536 A | 12/2019 | |
| JP | 2015046755 A | 3/2015 | |
| KR | 20110077329 A | 7/2011 | |

OTHER PUBLICATIONS

ITU-T G.8261/Y.1361 "Series G: Transmission Systems and Media, Digital Systems and Networks Packet over Transport aspects—Quality and availability targets; Series Y: Global Information Infrastructure, Internet Protocol Aspects and Next-Generation Networks," Recommendation ITU-T G.8261/Y.1361, Aug. 2013, 116 pages.

Belhaj, S., et al., "Modeling and Prediction of the Internet End-to-end Delay using Recurrent Neural Networks," Journal of Networks, vol. 4, No. 6, Aug. 2009, 8 pages.

ITU-T G.8260, "Series G: Transmission Systems and Media, Digital Systems and Networks; Packet over Transport aspects—Quality and availability targets; Definitions and terminology for synchronization in packet networks," Aug. 2010, 24 pages.

Wannstrom, L., "Assisted Partial Timing Support Using Neural Networks," Uppsala Universitet, Examensarbete 30 hp, Jun. 2018, 34 pages.

Frank Wang et al., "A Nonlinear Model for Time Synchronization," 2019 Workshop on Synchronization and Timing Services, 7 pages.

G .8261/Y.1361, Amendment 1, Mar. 2020, ITU T,Telecommunication Standardization Sector of ITU, Series G:Transmission Systems and Media,Digital Systems and Networks, Packet over Transport aspects, Synchronization quality and availability targets, 119 pages.

"IEEE Standard for a Precision Clock Synchronization Protocol for Networked Measurement and Control Systems," IEEE Instrumentation and Measurement Society, Sponsored by the Technical Committee on Sensor Technology (TC-9), IEEE Std 1588-2008, Jul. 24, 2008, 289 pages.

"IEEE Standard for a Precision Clock Synchronization Protocol for Networked Measurement and Control Systems," IEEE Instrumentation and Measurement Society, Sponsored by the Technical Committee on Sensor Technology (TC-9), IEEE Std 1588-2002, Nov. 8, 2002, 154 pages.

"IEEE Standard for a Precision Clock Synchronization Protocol for Networked Measurement and Control Systems," IEEE Instrumentation and Measurement Society, Sponsored by the Technical Committee on Sensor Technology (TC-9), IEEE Std 1588-2019, Nov. 2019, 499 pages.

* cited by examiner

SYNCHRONIZATION METHOD, APPARATUS, AND DEVICE, AND STORAGE MEDIUM

CROSS-REFERENCE TO RELATED APPLICATIONS

This application is a continuation of International Patent Application No. PCT/CN2020/142162, filed on Dec. 31, 2020, which claims priority to Chinese Patent Application No. 202010247790.9, filed on Mar. 31, 2020. The disclosures of the aforementioned applications are hereby incorporated by reference in their entireties.

TECHNICAL FIELD

The present disclosure relates to the communication field, and in particular, to a synchronization method, apparatus, and device, and a storage medium.

BACKGROUND

With convergence of traditional time-division multiplexing (TDM) systems and packet technologies, transmission of constant bit rate (CBR) services over packet switched networks needs to take into account synchronization requirements of their applications. The G.8260 standard and the G.8261 standard provide definitions and terms related to synchronization and timing on packet switched networks. The G.8260 standard and the G.8261 standard describe a manner of TDM clock and/or time recovery based on a timestamp when a packet arrives at a client, which is called adaptive clock recovery (ACR) and/or adaptive time recovery (ATR).

However, due to factors such as switching devices, dynamic scheduling of service flows, and delay on an intermediate network, link noise is introduced. As a result, a time when a packet arrives at a client through the intermediate network changes, and packet delay variation (PDV) is generated. Compared with clock signal jitter and wander at the physical layer, PDV noise is usually much larger. Therefore, if the CBR service clock and/or time recovery is performed in the ACR and/or ATR manner, noise reduction processing on the PDV is one of the most important aspects in clock and/or time synchronization.

SUMMARY

Embodiments of this application provide a synchronization method, apparatus, and device, and a storage medium, to resolve a problem that time and/or clock synchronization precision is not high. Technical solutions are as follows.

According to an aspect, a synchronization method is provided. The method may be applied to a network device. The method includes: obtaining a first timestamp difference of a packet on a target link, where the first timestamp difference is a difference between a sending timestamp and a receiving timestamp of the packet at a first moment; performing packet selection based on the first timestamp difference to obtain a second timestamp difference; obtaining a delay prediction value of the target link at the first moment, and compensating for the second timestamp difference based on the delay prediction value to obtain a compensated timestamp difference; and performing time and/or clock synchronization based on the compensated timestamp difference.

According to the synchronization method provided in this embodiment of the present disclosure, the delay prediction value of the target link is obtained, and the second timestamp difference obtained through packet selection is compensated for based on the delay prediction value, that is, PDV noise introduced by the target link is compensated for. In this way, the PDV noise is reduced, and the compensated timestamp difference more directly reflects frequency offset and phase offset information of a crystal oscillator relative to a frequency reference source. Therefore, time and/or clock synchronization performed based on the compensated timestamp difference has higher synchronization precision and improved synchronization performance.

In an example embodiment, the obtaining a delay prediction value of the target link at the first moment includes: predicting the delay prediction value of the target link at the first moment based on delay-related data of the target link, where the delay-related data includes at least one of the following data: a delay prediction value or a timestamp difference of the target link at a second moment, where the second moment is earlier than the first moment; and delay-related network parameter data of the target link at the first moment.

In an example embodiment, the obtaining a delay prediction value of the target link at the first moment includes: obtaining a delay prediction value sequence of the target link in a first period, where the delay prediction value sequence includes the delay prediction value of the target link at the first moment.

In an example embodiment, the obtaining a delay prediction value sequence of the target link in a first period includes: predicting the delay prediction value sequence of the target link in the first period based on a delay prediction value sequence or a timestamp difference sequence of the target link in a second period, where the second period is a period previous to the first period.

In an example embodiment, the obtaining a delay prediction value of the target link at the first moment includes: predicting delay of the target link based on a predictive model to obtain the delay prediction value of the target link at the first moment.

In an example embodiment, prior to the predicting delay of the target link based on a predictive model, the synchronization method further includes: obtaining, based on the target link, delay-related data used to train the predictive model; and performing model training by using the delay-related data, to obtain the predictive model.

In an example embodiment, the delay-related data includes at least one of a timestamp difference sequence and delay-related network parameter data of the target link.

In an example embodiment, the delay-related network parameter includes at least one of a quantity of target network nodes, traffic transmitted by the target network nodes over the target link, and a corresponding time when a timestamp is added. The target network nodes include a sending device and a receiving device of the packet, and a network device between the sending device and the receiving device.

In an example embodiment, the performing model training by using the delay-related data, to obtain the predictive model includes: in a model training process, using a timestamp difference sequence of the target link in a third period as a sample, and using a timestamp difference sequence of the target link in a fourth period as a label, where the third period is a period previous to the fourth period; in a model training process, using a delay-related network parameter of the target link at a target moment as a sample, and using a timestamp difference of the target link at the target moment as a label; or in a model training process, using a timestamp difference sequence of the target link in a third period and a delay-related network parameter of the target link at a target moment as samples, and using a timestamp difference of the target link at the target moment as a label, where the target moment is a moment next to the third period.

In an example embodiment, the performing time and/or clock synchronization based on the compensated timestamp difference includes: performing loop filtering on the compensated timestamp difference to obtain a second loop filtering result; performing direct digital frequency synthesis on the second loop filtering result to obtain a second frequency and/or phase adjustment value; and performing time and/or clock synchronization based on the second frequency and/or phase adjustment value.

In an example embodiment, when the delay-related data is obtained in an online manner, prior to the obtaining delay-related data, the synchronization method further includes: obtaining time information obtained by tracing a reference source, and detecting a phase difference of the time information to obtain a phase difference detection result; performing loop filtering on the phase difference detection result to obtain a first loop filtering result; and performing direct digital frequency synthesis on the first loop filtering result to obtain a first frequency and/or phase adjustment value; and performing time and/or clock synchronization based on the first frequency and/or phase adjustment value.

A synchronization apparatus is provided, where the apparatus includes: an obtaining module configured to obtain a first timestamp difference of a packet on a target link, where the first timestamp difference is a difference between a sending timestamp and a receiving timestamp of the packet at a first moment; a packet selection module configured to perform packet selection based on the first timestamp difference to obtain a second timestamp difference; a compensation module configured to obtain a delay prediction value of the target link at the first moment, and compensate for the second timestamp difference based on the delay prediction value to obtain a compensated timestamp difference; and a synchronization module configured to perform time and/or clock synchronization based on the compensated timestamp difference.

In an example embodiment, the obtaining module is configured to obtain a delay prediction value sequence of the target link in a first period, where the delay prediction value sequence includes the delay prediction value of the target link at the first moment.

In an example embodiment, the obtaining module is configured to predict a delay prediction value sequence of the target link in a first period based on a delay prediction value sequence or a timestamp difference sequence of the target link in a second period, where the second period is a period previous to the first period.

In an example embodiment, the obtaining module is configured to predict delay of the target link based on a predictive model to obtain the delay prediction value of the target link at the first moment.

In an example embodiment, the apparatus further includes: a training module configured to obtain, based on the target link, delay-related data used to train the predictive model; and perform model training by using the delay-related data, to obtain the predictive model.

In an example embodiment, the delay-related data includes at least one of a timestamp difference sequence and delay-related network parameter data of the target link.

In an example embodiment, the delay-related network parameter data includes at least one of a quantity of target network nodes, traffic transmitted by the target network nodes over the target link, and a corresponding time when a timestamp is added. The target network nodes include a sending device and a receiving device of the packet, and a network device between the sending device and the receiving device.

In an example embodiment, the training module is configured to: in a model training process, use a timestamp difference sequence of the target link in a third period as a sample, and use a timestamp difference sequence of the target link in a fourth period as a label, where the third period is a period previous to the fourth period; in a model training process, use a delay-related network parameter of the target link at a target moment as a sample, and use a timestamp difference of the target link at the target moment as a label; or in a model training process, use a timestamp difference sequence of the target link in a third period and a delay-related network parameter of the target link at a target moment as samples, and use a timestamp difference of the target link at the target moment as a label, where the target moment is a moment next to the third period.

In an example embodiment, the synchronization module is configured to: perform loop filtering on the compensated timestamp difference to obtain a second loop filtering result; perform direct digital frequency synthesis on the second loop filtering result to obtain a second frequency and/or phase adjustment value; and perform time and/or clock synchronization based on the second frequency and/or phase adjustment value.

In an example embodiment, the synchronization module is further configured to: obtain time information obtained by tracing a reference source and detect a phase difference of the time information to obtain a phase difference detection result; perform loop filtering on the phase difference detection result to obtain a first loop filtering result; perform direct digital frequency synthesis on the first loop filtering result to obtain a first frequency and/or phase adjustment value; and perform time and/or clock synchronization based on the first frequency and/or phase adjustment value.

A synchronization device is further provided. The device includes a memory and a processor, where the memory stores at least one instruction, and the at least one instruction is loaded and executed by the processor, to implement any one of the foregoing synchronization methods.

A computer-readable storage medium is further provided, where the storage medium stores at least one instruction, and the instruction is loaded and executed by a processor to implement any one of the foregoing synchronization methods.

Another communication apparatus is provided. The apparatus includes a transceiver, a memory, and a processor. The transceiver, the memory, and the processor communicate with each other through an internal connection path. The memory is configured to store instructions. The processor is configured to execute the instructions stored in the memory, to control the transceiver to receive and send signals. In addition, when the processor executes the instructions stored in the memory, the processor is enabled to perform the synchronization method in any one of the foregoing possible implementations.

In an example embodiment, there is one or more processors, and there is one or more memories.

In an example embodiment, the memory may be integrated with the processor, or the memory is disposed independently of the processor.

In a specific implementation process, the memory may be a non-transitory memory, for example, a read-only memory (ROM). The memory and the processor may be integrated into a same chip, or may be separately disposed on different chips. A type of the memory and a manner of disposing the memory and the processor are not limited in embodiments of this application.

A computer program product is provided. The computer program product includes computer program code. When the computer program code is run on a computer, the computer is enabled to perform the synchronization methods according to the foregoing aspects.

A chip is provided. The chip includes a processor configured to invoke, from a memory, instructions stored in the memory and run the instructions, so that a communication device on which the chip is installed performs the synchronization methods in the foregoing aspects.

Another chip is provided. The chip includes an input interface, an output interface, a processor, and a memory. The input interface, the output interface, the processor, and the memory are connected through an internal connection path. The processor is configured to execute code in the memory. When the code is executed, the processor is configured to perform the synchronization methods in the foregoing aspects.

DESCRIPTION OF EMBODIMENTS

Terms used in implementations of this application are only used to explain embodiments of this application, but are not intended to limit this application.

With convergence of traditional TDM systems and packet technologies, transmission of CBR services over packet-switched networks needs to take into account synchronization requirements of their applications. The G.8260 standard and the G.8261 standard provide definitions and terms related to synchronization and timing on packet switched networks. The G.8260 standard and the G.8261 standard describe a manner of TDM clock recovery based on a timestamp when the packet arrives at a client, which is called ACR, and a manner of TDM time recovery based on a timestamp when the packet arrives at a client, which is called ATR.

However, due to factors such as switching devices, dynamic scheduling of service flows, and delay on an intermediate network, link noise is introduced. As a result, a time when a packet arrives at a client through the intermediate network changes, and PDV is generated. Compared with clock signal jitter and wander at the physical layer, PDV noise is usually much larger. The PDV noise is not only caused by noise of network components, but also closely related to a network architecture and scheduling mode. In addition, the PDV noise may contain extremely low frequency noise due to periodic changes of network traffic. Therefore, if the CBR service clock and/or time recovery is performed in the ACR and/or ATR manner, noise reduction processing on the PDV is one of the most important aspects in clock and/or time synchronization.

Figure 1:
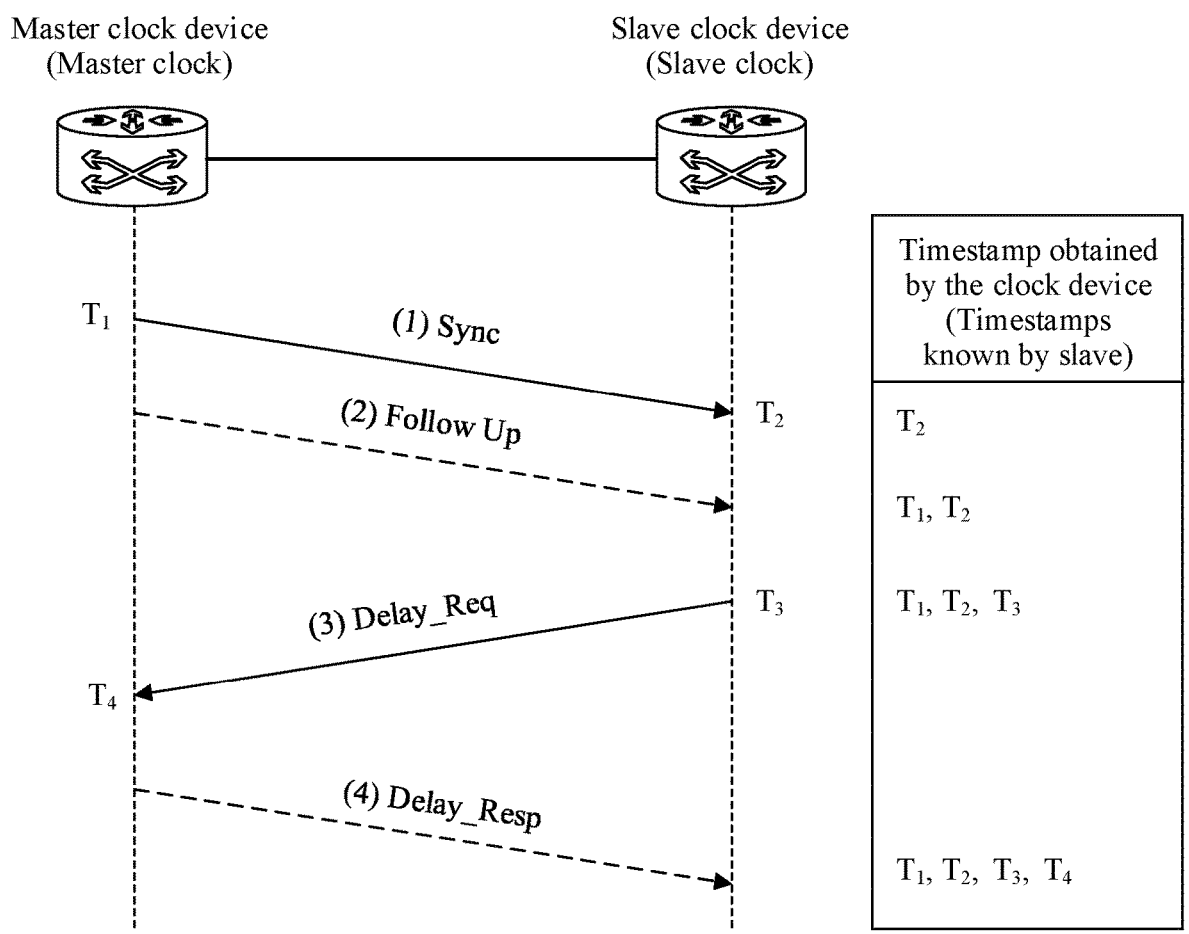
FIG. 1 is a schematic diagram of a process of a 1588 delay response mechanism according to an embodiment of the present disclosure.

For example, in a synchronization process of global positioning system (GPS) assisted partial timing support (APTS), the GPS sinks to a closed user group (CSG) location, and a network transparently transmits a 1588 packet. That is, in normal cases, the GPS is used for time synchronization. In abnormal cases, 1588 packets are transparently transmitted to obtain a maintenance window. The 1588 packets are standard packets of the Institute of Electrical and Electronics Engineers (IEEE) 1588 protocol. A full name of the IEEE 1588 protocol standard is the Precision Clock Synchronization Protocol standard for network measurement and control systems, and is referred to as the Precision Timing Protocol (PTP) for short. FIG. 1 shows a synchronization principle of the delay request-response mechanism proposed in the IEEE 1588 protocol.

In FIG. 1, PTP packets transmitted between a master clock and a slave clock include: (1) a synchronization (sync) packet, (2) a follow_up packet, (3) a delay request (delay_req) packet, and (4) a delay response (delay_resp) packet. The packet receiving and sending process of a delay request-response synchronization mechanism includes the following steps.

Step 1: The master clock periodically sends a sync packet, and records a precise sending timestamp T1 when the sync packet leaves the master clock. In addition, the sync packet is sent periodically with either sending time information carried or not.

Step 2: The master clock encapsulates the precise sending timestamp T1 into a follow_up packet and sends the packet to the slave clock.

Step 3: The slave clock records a precise arrival timestamp T2 when the sync packet arrives at the slave clock.

Step 4: The slave clock sends a delay_req packet and records a precise sending timestamp T3.

Step 5: The master clock records a precise arrival timestamp T4 when the delay_resp packet arrives at the master clock.

Step 6: The master clock sends a delay_resp packet carrying the precise timestamp T4 to the slave clock.

The slave clock obtains four precise packet receiving and sending times: T1, T2, T3, and T4.

Although synchronization can be implemented based on the foregoing delay request-response synchronization mechanism, because clock information traverses a third party or does not support hop-by-hop recovery, the APTS has some limitations in a network scenario of transparent transmission of 1588 packets. In addition, due to factors such as switching devices, dynamic scheduling of service flows, and delay on an intermediate network, link noise is introduced. As a result, a time when a packet arrives at a network device (client) such as a router changes through the intermediate network, and PDV is generated. Consequently, synchronization tracing performance of ACR and/or ATR deteriorates.

In view of this, an embodiment provides a synchronization method. In the synchronization method, a delay prediction value is predicted for a packet that arrives at a network device in a future time, and the delay prediction value is used to compensate for PDV noise introduced by an intermediate network link, so that a compensated timestamp difference more directly reflects frequency offset and phase offset information of a crystal oscillator relative to a frequency reference source. Because a part of PDV noise of the intermediate network is compensated for, in a case in which synchronization is implemented by using a phase-locked loop, PDV noise in an input signal input to the phase-locked loop can be reduced. This can bring higher synchronization precision, and improve ACR and/or ATR synchronization performance.

The phase-locked loop refers to a circuit or a module used in a receiver of a network device. A function of the phase-locked loop is to process a received signal and extract clock phase information from the signal. In other words, a clock signal is simulated for a received signal, so that the two signals are synchronized (or coherent) from a specific perspective. In a locked condition (that is, after capturing is completed), the simulated clock signal has a phase difference relative to the clock signal in the received signal, and therefore is vividly referred to as a phase locker.

For example, the phase-locked loop usually includes a phase detector (PD), a loop filter (LF), and a voltage-controlled oscillator (VCO) to form a forward path, and includes a frequency divider to form a frequency phase feedback path. A working principle of the phase-locked loop is to detect a phase difference between an input signal and an output signal, convert the detected phase difference signal into a voltage signal by using a phase detector, and output the voltage signal. After the voltage signal is filtered by a low-pass filter, a control voltage of the voltage-controlled oscillator is formed to control a frequency of an output signal of the oscillator. Then, a frequency and a phase of the output signal of the oscillator are fed back to the phase detector through the feedback path. In a working process of the phase-locked loop, when the frequency of the output signal reflects the frequency of the input signal proportionally, the output voltage and the input voltage maintain a fixed phase difference value. In this way, the phases of the output voltage and the input voltage are locked.

As described above, the phase detector is configured to detect a phase difference between an input signal and an output signal, and output an error voltage. Noise and interference components in the error voltage are filtered out by the low-pass loop filter to form the control voltage of the voltage-controlled oscillator (VCO). The result of the control voltage acting on the voltage-controlled oscillator is that an output oscillation frequency of the voltage-controlled oscillator is pulled to an input signal frequency of the loop. When the two frequencies are equal, the loop is locked, which is called locking. The DC control voltage for locking is provided by the phase detector. Therefore, there is a phase difference between two input signals of the phase detector.

In addition to the foregoing phase detector, loop filter, and the like, an all-digital frequency synthesizer, for example, a direct digital frequency synthesizer (DDS), is also used to implement synchronization. The DDS includes a phase accumulator, a waveform ROM, a D and/or A converter, and a low-pass filter. After a clock frequency is given, a frequency of an output signal depends on a frequency controller, a frequency resolution depends on a quantity of bits of the accumulator, a phase resolution depends on a quantity of address line bits of the ROM, and amplitude quantization noise depends on a data bit word length of the ROM and a quantity of bits of the D and/or A converter.

Figure 2:
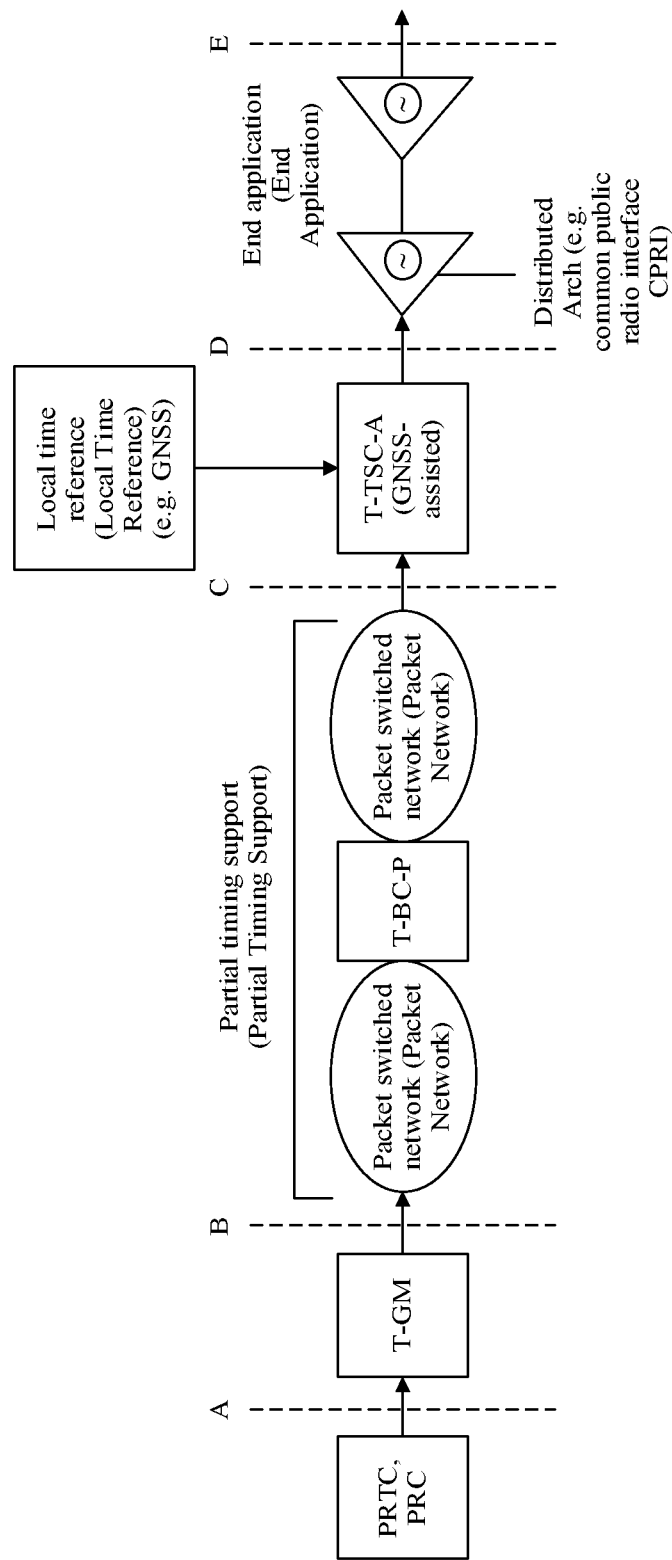
FIG. 2 is a schematic structural diagram of an APTS application scenario according to an embodiment of the present disclosure.

In an example embodiment, the synchronization method provided in this embodiment may be applied to an APTS application scenario shown in FIG. 2. As shown in FIG. 2, in the APTS application scenario, a primary reference time clock (PRTC) serves as a source end of a packet to provide time reference information. A telecom grandmaster (T-GM) serves as a master clock device and adds a timestamp T1 to the packet. The T1 arrives at a slave clock device, that is, a telecom time slave clock-assisted (T-TSC-A), through the T-GM and a PTS network, where A indicates that the slave clock device has a local time reference source for auxiliary synchronization. A transmission path of a 1588 sync packet is used as an example. When the timestamp T1 of the master clock device arrives at the slave clock device T-TSC-A, an RTC counter of the slave clock device records an arrival moment of T1 as a timestamp T2. Then, packet selection filtering is performed on a timestamp difference (T2−T1) based on a packet selection algorithm. Similarly, if the ATR is used for time synchronization, the slave clock device obtains timestamps such as T1, T2, T3, and T4 in sequence, and performs packet filtering on the timestamp differences (T2−T1) and (T4−T3) based on the packet selection algorithm.

Figure 3:
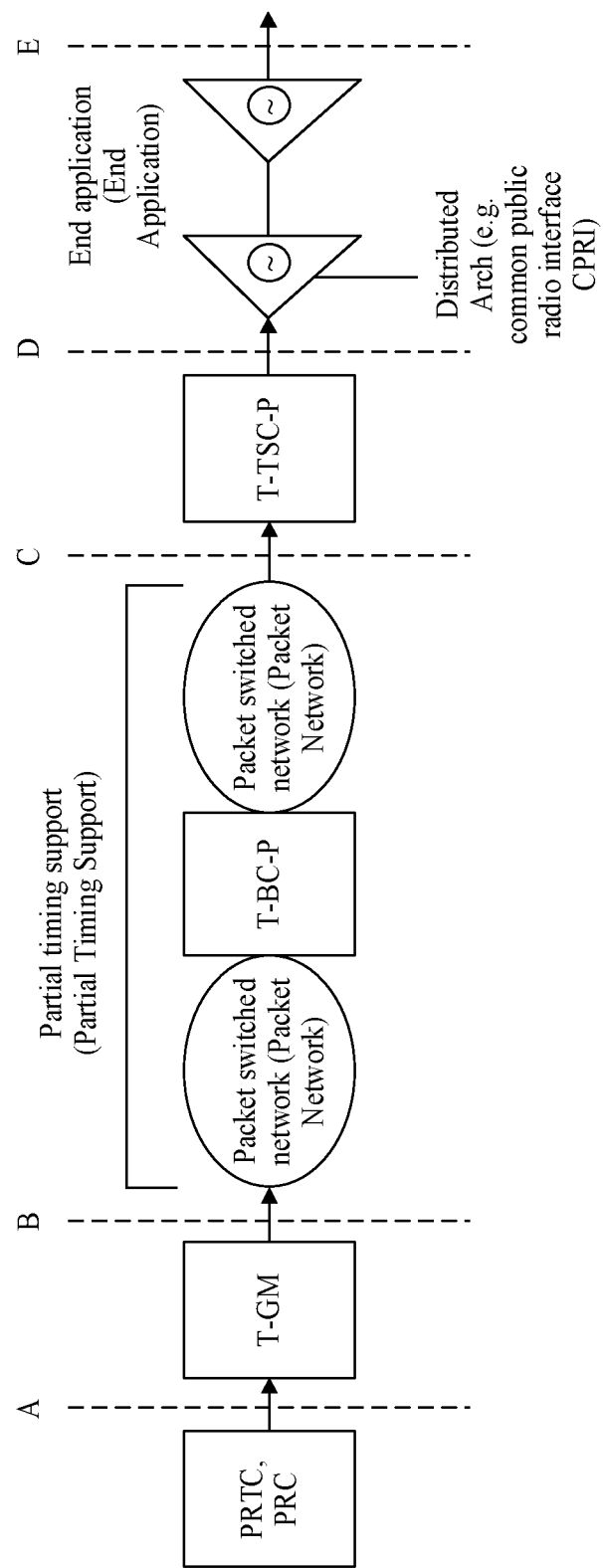
FIG. 3 is a schematic structural diagram of a PTS application scenario according to an embodiment of the present disclosure.

In an example embodiment, the synchronization method provided in this embodiment may be further applied to a PTS application scenario shown in FIG. 3. As shown in FIG. 3, in the PTS application scenario, a PRTC serves as a source end of a packet to provide time reference information. The T-GM serves as a master clock device and adds a timestamp T1 to the packet. The T1 arrives at a slave clock device, that is, a telecom time slave clock-partial support (T-TSC-P), through the T-GM and a PTS network, where P indicates that the slave clock device exists in the partial time synchronization (PTS) network. In the PTS application scenario, the slave clock device T-TSC-P does not have a capability of directly obtaining time information from the GNSS. Therefore, transparent transmission of 1588 packets is a main manner of clock and/or time synchronization in the PTS application scenario. To capture and test PDV on the PTS intermediate network, the master and slave clocks need to synchronize with a same time reference source.

Figure 4:
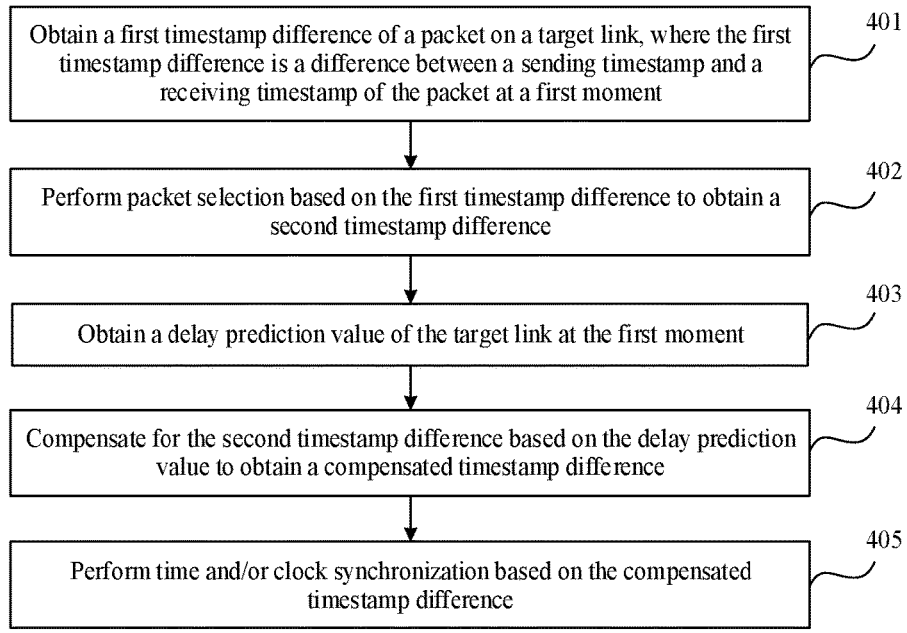
FIG. 4 is a flowchart of a synchronization method according to an embodiment of the present disclosure.

An embodiment provides a synchronization method. The method is applicable to, but not limited to, the application scenario shown in FIG. 2 or FIG. 3. An example in which a network device performs the synchronization method is used. The network device may be a master clock device, or may be a slave clock device. This is not limited in this embodiment. As shown in FIG. 4, the synchronization method provided in this embodiment may include the following several processes.

401: Obtain a first timestamp difference of a packet on a target link, where the first timestamp difference is a difference between a sending timestamp and a receiving timestamp of the packet at a first moment.

In the synchronization method provided in this embodiment, the packet is transmitted on the target link. The first timestamp difference may be a difference between a timestamp when the packet arrives at the network device and a timestamp when the packet is sent, that is, a difference between the sending timestamp and the receiving timestamp of the packet at the first moment. The packet includes, but is not limited to, a 1588 packet, and may further carry data other than the 1588 packet. Content of the packet is not limited in this embodiment.

As shown in FIG. 1, an example in which the network device is a slave clock device is used. The network device not only can obtain a sending timestamp T1 recorded by the master clock device, but can also record an arrival timestamp T2 when the packet arrives. In this case, the first timestamp difference=(T2−T1) or (T1−T2). For example, the network device may further obtain T3 and T4 in addition to T1 and T2. Therefore, the first timestamp difference may alternatively be (T4−T3) or (T3−T4).

402: Perform packet selection based on the first timestamp difference to obtain a second timestamp difference.

Regardless of whether the first timestamp difference is (T2−T1), (T1−T2), (T4−T3), or (T3−T4), after the first timestamp difference is obtained, packet selection may be performed on the first timestamp difference by using a packet selection algorithm, to obtain the second timestamp difference.

The packet selection algorithm used is not limited in this embodiment. An average value of a plurality of first timestamp differences in an observation period may be used as the second timestamp difference. Correspondingly, a moment corresponding to any first timestamp difference may be used as a first moment corresponding to the second timestamp difference. Alternatively, the first timestamp differences may be filtered. For example, PDV may be reduced based on the packet selection method mentioned in the appendix of the G.8261 standard. In this method, it is assumed that the PDV changes slowly with a delay floor during an observation period. The delay floor may be a minimum delay of a packet transmitted on a network path, that is, the target link. In normal cases, that is, in non-congested loading conditions, there is a high probability that the PDV appears near the delay floor. Therefore, a current mainstream packet selection algorithm in ACR and/or ATR is to select a minimum timestamp difference within an observation period, and use the minimum timestamp difference as the second timestamp difference. Correspondingly, a moment corresponding to the minimum timestamp difference may be used as the first moment corresponding to the second timestamp difference.

Although packet selection using a packet selection algorithm can suppress link noise, for example, filter out high-frequency noise outside the bandwidth of a filter. However, PDV is closely related to the variation of network traffic, so the suppression on link noise by using packet selection algorithm is limited. For example, when the network traffic experiences an extremely low frequency periodic change, the PDV also presents an extremely low frequency slow change, and cannot be filtered out by the filter. In addition, the network scheduling mechanism may cause the PDV to drop abnormally at a probability, and the PDV cannot be excluded by using the packet selection algorithm, resulting in poor clock and/or time synchronization performance. Even in some scenarios where the PDV changes greatly, the performance of clock and/or time synchronization using the packet selection algorithm cannot satisfy the requirements of the standard, resulting in a limited application scope.

Therefore, in the synchronization method provided in this embodiment, PDV compensation is further provided to further reduce link noise in addition to the packet selection manner. For details, refer to the following steps.

403: Obtain a delay prediction value of the target link at the first moment.

In an example embodiment, the obtaining a delay prediction value of the target link at the first moment includes: predicting the delay prediction value of the target link at the first moment based on delay-related data of the target link, where the delay-related data includes at least one of the following data: a delay prediction value or a timestamp difference of the target link at a second moment, where the second moment is earlier than the first moment; and delay-related network parameter data of the target link at the first moment.

In an example embodiment, the obtaining a delay prediction value of the target link at the first moment includes: obtaining a delay prediction value sequence of the target link in a first period, where the delay prediction value sequence includes the delay prediction value of the target link at the first moment.

In an example embodiment, the obtaining a delay prediction value sequence of the target link in a first period includes: predicting the delay prediction value sequence of the target link in the first period based on a delay prediction value sequence or a timestamp difference sequence of the target link in a second period, where the second period is a period previous to the first period.

In an example embodiment, the obtaining a delay prediction value of the target link at the first moment includes but is not limited to predicting delay of the target link based on a predictive model to obtain the delay prediction value of the target link at the first moment. For example, the predictive model may be trained based on machine learning, so as to predict the delay prediction value of the target link at the first moment based on the predictive model.

For example, prior to the predicting delay of the target link based on a predictive model, the synchronization method further includes: obtaining, based on the target link, delay-related data used to train the predictive model; and performing model training by using the delay-related data, to obtain the predictive model. In the synchronization method provided in this embodiment, the predictive model of the target link is trained by using a machine learning algorithm, and a process of performing delay prediction based on the predictive model obtained through machine learning training is divided into two phases: a learning phase (or a training phase) and a prediction phase. Next, the two phases are separately described by using examples.

Phase 1: a learning phase (or a training phase) in which the predictive model of the target link is trained by using the machine learning algorithm.

The learning phase may be offline learning or online learning. In an example embodiment, the obtaining, based on the target link, delay-related data used to train a predictive model includes: obtaining the delay-related data in an offline manner, or obtaining the delay-related data in an online manner, where the delay-related data includes at least one of a timestamp difference sequence and delay-related network parameter data of the target link. The delay-related network parameter data includes but is not limited to at least one of a quantity of target network nodes, traffic transmitted by the target network nodes over the target link, and a corresponding time when a timestamp is added. The target network nodes include a sending device and a receiving device of the packet, and a network device between the sending device and the receiving device.

Offline learning is used as an example. A timestamp difference sequence (that is, PDV sample data) and/or delay-related network parameter data of the target link may be obtained in advance. The delay-related network parameter data includes but is not limited to a quantity of target network nodes, traffic transmitted by the target network nodes over the target link, a time (year/month/day/hour/minute/second) when a timestamp is added, and the like. Affected by user habits of network devices, network traffic generally fluctuates in a regular pattern in a specific period (for example, in one day). This pattern can be used as a main characteristic of delay for learning.

A manner of performing model training by using delay-related data to obtain a predictive model includes but is not limited to the following several manners.

Manner 1: In a model training process, a timestamp difference sequence of the target link in a third period is used as a sample, and a timestamp difference sequence of the target link in a fourth period is used as a label, where the third period is a period previous to the fourth period.

For example, the fourth period is a current period. When model training is performed in the current period by using delay-related data to obtain the predictive model, the input data is a delay sequence of a period previous to the current period (that is, the third period), for example, delays at moments t−n, t−n+1, . . . , t−2, and t−1. In this case, delays at moments t, t+1, t+2, . . . , and t+k are learned based on the delays at the moments t−n, t−n+1, . . . , t−2, and t−1, where n≥1, and k≥0. In other words, a delay sequence of the current period is learned based on the delay sequence of the previous period.

Manner 2: In a model training process, a delay-related network parameter of the target link at a target moment is used as a sample, and a timestamp difference of the target link at the target moment is used as a label.

In an example embodiment, that the target moment is the moment t is used as an example. If the delay-related network parameter data can be obtained, input data may also be the delay-related network parameter data at the moment t, and delay at the moment t is learned based on the delay-related network parameter data at the moment t. Alternatively, the target moment may be a current moment, that is, delay at the current moment is learned based on delay-related network parameter data at the current moment.

Manner 3: In a model training process, a timestamp difference sequence of the target link in a third period and a delay-related network parameter of the target link at a target moment are used as samples, and the timestamp difference of the target link at the target moment is used as a label, where the target moment is a moment next to the third period.

In manner 3, learning is separately performed based on both the timestamp difference sequence and the delay-related network parameter data to obtain the predictive model of the target link.

Online learning is used as an example. Because online learning is used, learning needs to be performed on the premise of time synchronization. Therefore, prior to the obtaining the delay-related data in an online manner, the synchronization method further includes: obtaining time information obtained by tracing a reference source, and detecting a phase difference of the time information to obtain a phase difference detection result; performing loop filtering on the phase difference detection result to obtain a first loop filtering result; performing direct digital frequency synthesis on the first loop filtering result to obtain a first frequency and/or phase adjustment value; and performing time and/or clock synchronization based on the first frequency and/or phase adjustment value. For example, the network device traces clock time information of the global navigation satellite system (global navigation satellite system, GNSS) or another frequency reference source to obtain the time information, so as to obtain the reference time information.

Then, a timestamp difference sequence and delay-related network parameter data of links on a network may be obtained in real time. The delay-related network parameter data includes but is not limited to a quantity of target network nodes, traffic transmitted by the target network nodes over the target link, a time (year/month/day/hour/minute/second) when a timestamp is added, and the like. An example is which the delay-related data is a timestamp difference sequence is used. Input data may be a pure timestamp difference sequence. Delays at moments t, t+1, t+2, . . . , and t+k are learned based on delays at moments t−n, t−n+1, . . . , t−2, and t−1, where n≥1, and k≥0. Refer to the foregoing manner 1. If the delay-related network parameter data can be obtained, the input data used to learn the delay at the moment t may also be delay-related network parameter data at the moment t. Refer to the foregoing manner 2. Alternatively, learning may be performed based on both the timestamp difference sequence and the delay-related network parameter data to obtain the predictive model of the target link. Refer to manner 3.

It should be noted that, regardless of whether the foregoing offline learning manner or the foregoing online learning manner is used, a type of the obtained predictive model is not limited in this embodiment, and a machine learning model that can implement delay prediction may be used as an initial predictive model in this embodiment.

Phase 2: a prediction phase in which the delay of the target link based on the predictive model of the target link is predicted to obtain the delay prediction value of the target link at the first moment.

Because the predictive model of the target link has been obtained through training in phase 1, when the network device needs to perform clock and/or time synchronization with the frequency reference source based on the timestamp information, the network device inputs delay-related data of the target link in the prediction phase to the machine learning model trained in the learning phase, that is, the predictive model of the target link, to output the delay prediction value of the target link.

For example, the delay-related data of the target link in the prediction phase may also include at least one of a timestamp difference sequence of the target link in the prediction phase and delay-related network parameter data in the prediction phase. The delay-related network parameter data in the prediction phase includes but is not limited to at least one of a quantity of target network nodes, traffic transmitted by the target network nodes over the target link, and a corresponding time when a timestamp is added.

It should be noted that, if the delay prediction value at a single moment is output through prediction based on the predictive model, when the delay prediction value of the target link at the first moment is obtained, the delay prediction value that is at the first moment and that is output based on the predictive model may be directly used as the delay prediction value of the target link at the first moment. If a delay prediction sequence is output through prediction based on the predictive model, the obtaining a delay prediction value of the target link at the first moment includes: obtaining a delay prediction value sequence of the target link, where the delay prediction value sequence includes the delay prediction value of the target link at the first moment. In other words, if the delay prediction value sequence is predicted, if the delay prediction value sequence includes the delay prediction value at the first moment, the predictive model may not need to perform prediction at each moment.

For example, the obtaining a delay prediction value of the target link at the first moment includes: inputting delay-related data of the target link into the predictive model, and predicting the delay prediction value of the target link at the first moment based on the predictive model.

In an example embodiment, the obtaining a delay prediction value of the target link at the first moment includes: obtaining a delay prediction value sequence of the target link in a first period based on the predictive model, where the delay prediction value sequence includes the delay prediction value of the target link at the first moment.

In an example embodiment, the obtaining a delay prediction value sequence of the target link in a first period includes: inputting the delay prediction value sequence or the timestamp difference sequence of the target link in a second period into the predictive model, and predicting the delay prediction value sequence of the target link in the first period based on the predictive model, where the second period is a period previous to the first period.

404: Compensate for the second timestamp difference based on the delay prediction value to obtain a compensated timestamp difference.

In an example embodiment, the compensating for the second timestamp difference based on the delay prediction value may be subtracting the delay prediction value from the second timestamp difference to obtain the compensated timestamp difference.

For example, if the second timestamp difference is T2–T1, the delay prediction value is subtracted from the difference between T2–T1 to obtain the compensated timestamp difference. For another example, if the second timestamp difference is T4–T3, the delay prediction value is subtracted from the difference T4–T3 to obtain the compensated timestamp difference.

It should be noted that, both T2–T1 and T4–T3 are obtained in a case in which link delay noise and crystal oscillator noise are included, where the link delay noise is also referred to as PDV noise. The delay value of the target link is predicted, and the second timestamp difference is compensated based on the delay prediction value, so that the PDV noise introduced by links on an intermediate network can be compensated for, so that the compensated timestamp difference more directly reflects frequency offset and phase offset information of the crystal oscillator relative to the frequency reference. Therefore, time synchronization performed based on the compensated timestamp difference has higher synchronization precision and improved synchronization performance. For details about the synchronization process, refer to the following step 405.

405: Perform time and/or clock synchronization based on the compensated timestamp difference.

In an example embodiment, the performing time and/or clock synchronization based on the compensated timestamp difference includes: performing loop filtering on the compensated timestamp difference to obtain a second loop filtering result; performing direct digital frequency synthesis on the second loop filtering result to obtain a second frequency and/or phase adjustment value; and performing time and/or clock synchronization based on the second frequency and/or phase adjustment value.

For example, loop filtering may be implemented by using a loop filter. A loop filter is a type of filter used in a loop, which is referred to as a loop filter. The loop filter is an important component of a phase locked loop (phase locked loop, PLL) circuit. Refer to the foregoing description of the phase locked loop. In this embodiment, the loop filter may be a low-pass filter having the following two functions: One is to attenuate a high-frequency error component at an output end of the phase detector, to improve anti-interference performance; and the other is to raise the loop for short-term storage and quick signal recovery when the loop jumps out of the locked state. The loop filter is generally a linear circuit, which includes a linear component resistor, a capacitor and an operational amplifier. The loop filter is configured to attenuate a rapidly changing phase error caused by noise of an input signal and smooth a high-frequency component leaked by a phase detector, that is, filtering, so as to precisely estimate an original signal at an output end of the loop filter. An order of the loop filtering and a noise bandwidth determine a dynamic response of the loop filter to the signal.

According to the synchronization method provided in this embodiment, the delay prediction value of the target link is obtained, and the second timestamp difference obtained through packet selection is compensated for based on the delay prediction value, that is, PDV noise introduced by the target link is compensated for. In this way, the PDV noise is reduced, and the compensated timestamp difference more directly reflects frequency offset and phase offset information of a crystal oscillator relative to a frequency reference source. Therefore, time and/or clock synchronization performed based on the compensated timestamp difference has higher synchronization precision and improved synchronization performance.

To facilitate understanding of the synchronization methods provided in embodiment, the following separately uses different application scenarios as examples to describe the synchronization methods provided in embodiments of this application.

Application Scenario 1: APTS Application Scenario

Figure 5:
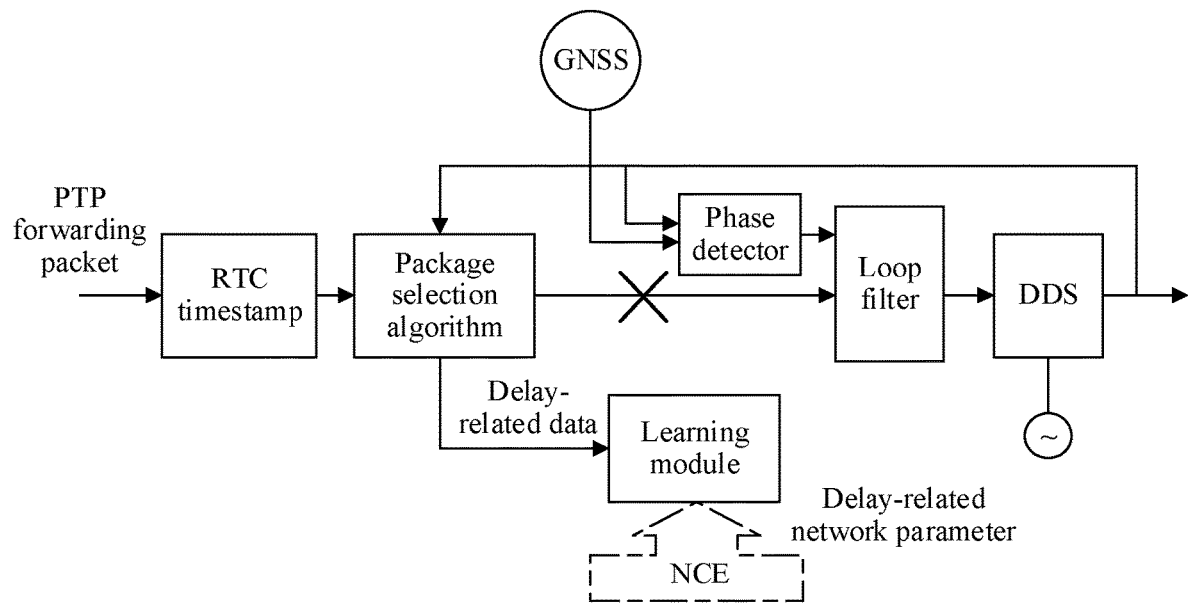
FIG. 5 is a schematic diagram of a model training process in an APTS application scenario according to an embodiment of the present disclosure.

The APTS application scenario shown in FIG. 2 is still used as an example. In FIG. 2, the PRTC is used as a source end of a packet to provide time reference information. The T-GM functions as a master clock device, and adds a timestamp T1 to the packet. The T1 arrives at a slave clock device T-TSC-A through the T-GM and a PTS network. An example in which a network device that performs the synchronization method provided in embodiments of this application on a transmission path of a 1588 sync packet is a slave clock device T-TSC-A is used for description. When the timestamp T1 of the master clock device arrives at the slave clock device T-TSC-A, a real time clock (real time clock, RTC) counter of the slave clock device records an arrival moment of T1 as a timestamp T2. Then, packet filtering is performed on a timestamp difference (T2–T1) based on the packet selection algorithm. Similarly, if the ATR is used for time synchronization, the slave clock device obtains timestamps such as T1, T2, T3, and T4 in sequence, and performs packet filtering on the timestamp differences (T2–T1) and (T4–T3) based on the packet selection algorithm. An example in which a predictive model is obtained in an online learning manner in the APTS application scenario is used. FIG. 5 is a schematic diagram of a delay online learning phase, and FIG. 6 is a schematic diagram of a delay prediction phase.

In an implementation process of the delay online learning phase shown in FIG. 5, the loop traces clock time information of the GNSS, and the time information of the GNSS sequentially passes through a phase detector, a loop filter, and a DDS, to generate a phase adjustment value, so that a network device synchronizes time with the GNSS. In this case, a 1588 ACR or ATR loop is in an open-loop state. If network parameter data on a network control engine (network control engine, NCE) cannot be obtained, the delay after packet selection (noise reduction preprocessing) is sent to a learning module, that is, an initial machine learning model for learning. If the delay-related network parameter data on the NCE can be obtained, the delay-related network parameter data is sent to the learning module for learning to obtain the predictive model. The NCE is configured to store the network parameter data.

Figure 6:
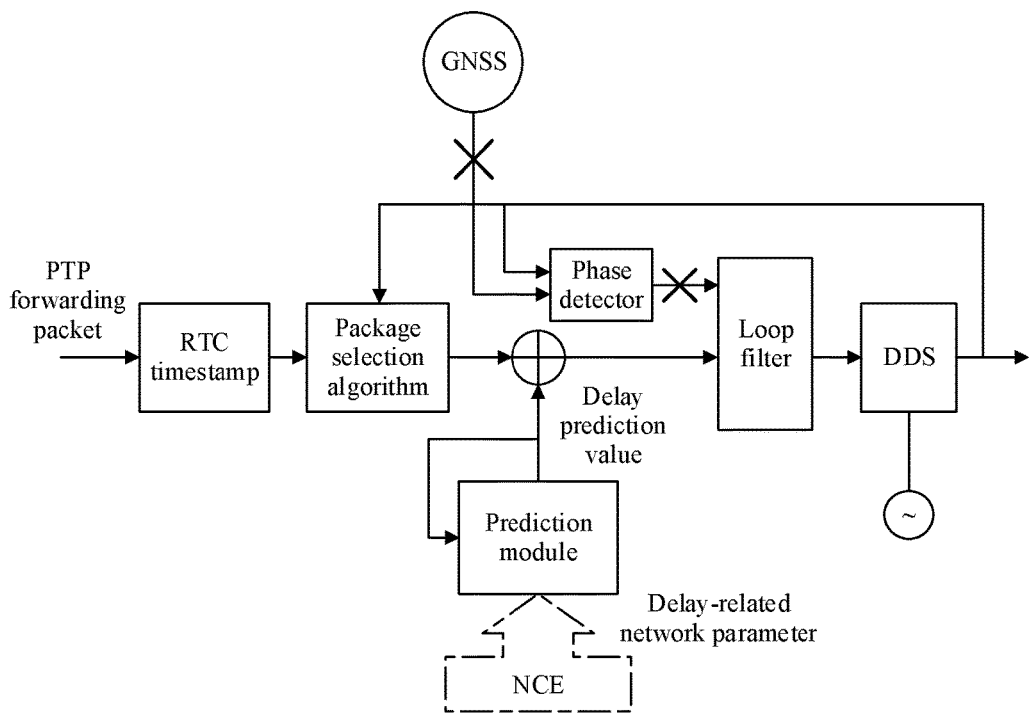
FIG. 6 is a schematic diagram of a synchronization process in an APTS application scenario according to an embodiment of the present disclosure.

In an implementation process of the delay prediction phase shown in FIG. 6, when the GNSS is lost, the original GNSS tracing loop is immediately disconnected, and is switched to the 1588 ACR or ATR loop. In this case, the obtained (T2−T1) or (T4−T3) packet contains link delay noise and crystal oscillator noise. A delay prediction value of a link is output based on a predictive model that has been trained, and the delay prediction value is compensated for (T2−T1) or (T4−T3) that is output through packet selection, to obtain a compensated timestamp difference. Then, the compensated timestamp difference is sent to the loop filter for filtering, and a filtering result is input to the DDS for direct digital frequency synthesis, to generate a frequency and/or phase adjustment value. Time and/or clock synchronization is performed based on the frequency and/or phase adjustment value to achieve clock and/or time synchronization between the master clock device and the slave clock device.

It can be learned from the foregoing process that, because the PDV noise in the timestamp difference is partially compensated for, the timestamp difference more reflects noise of the crystal oscillator, thereby improving synchronization precision of the ACR and/or ATR, and further improving synchronization performance.

Application Scenario 2: PTS Application Scenario

Figure 7:
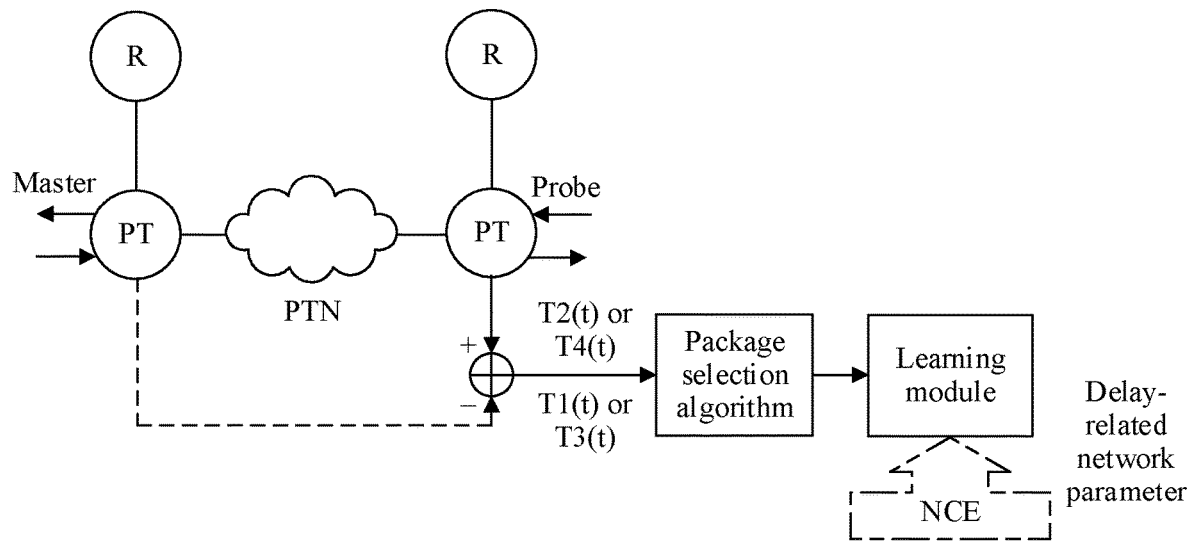
FIG. 7 is a schematic diagram of a model training process in a PTS application scenario according to an embodiment of the present disclosure.
Figure 8:
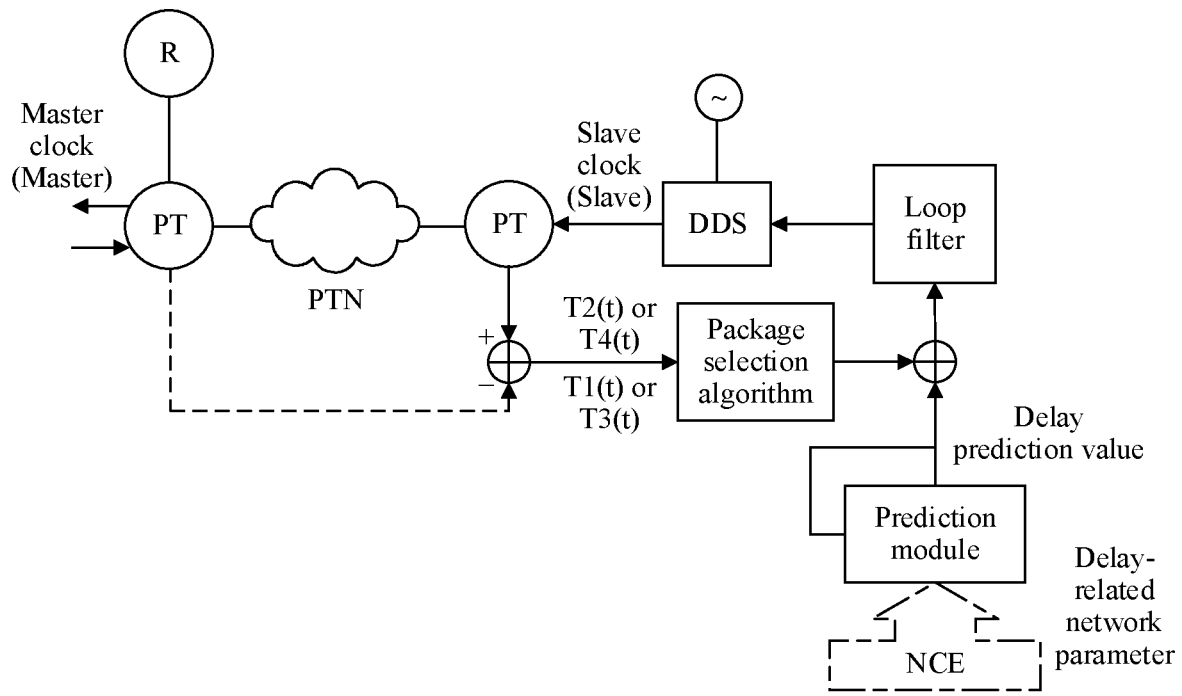
FIG. 8 is a schematic diagram of a synchronization process in a PTS application scenario according to an embodiment of the present disclosure.

The PTS application scenario shown in FIG. 3 is still used as an example. In FIG. 3, the PRTC serves as a source end of the packet to provide time reference information. The T-GM serves as a master clock device and adds a timestamp T1 to the packet. The T1 arrives at a slave clock device T-TSC-P through the T-GM and a PTS network. In the PTS application scenario, the slave clock device T-TSC-P does not have a capability of directly obtaining time information from the GNSS. Therefore, transparent transmission of 1588 packets is a main manner of clock and/or time synchronization in the PTS application scenario. An example in which a network device that performs the synchronization method provided in this embodiment is a slave clock device T-TSC-A is used for description. If PDV in a PTS intermediate network needs to be captured and tested, the master clock device and the slave clock device need to synchronize with a same time reference source. An example in which a predictive model is obtained in an offline learning manner in the PTS application scenario is used. FIG. 7 is a schematic diagram of a delay offline learning phase, and FIG. 8 is a schematic diagram of a delay prediction phase. In FIG. 7 and FIG. 8, R represents a time or frequency reference (time or frequency reference), and PT represents a data packet timestamp (packet timestamp).

In an implementation process of the delay offline learning phase shown in FIG. 7, a timestamp difference (T2−T1) or (T4−T3) is obtained from a clock source device. Because the master clock source device and the slave clock source device have synchronized with the time reference source, variation of the timestamp difference in this case is basically equivalent to the PDV. If the network parameter data on an NCE cannot be obtained, the delay is sent to the learning module for learning after packet selection (noise reduction preprocessing). If the delay-related network parameter data on the NCE can be obtained, the delay-related network parameter data is sent to the learning module for learning to obtain the predictive model.

In an implementation process of the delay prediction phase shown in FIG. 8, a slave clock source device traces a source clock in an ACR and/or ATR manner. In this case, (T2−T1) or (T4−T3) obtained from the clock source device includes link delay noise and crystal oscillator noise. A delay prediction value of a link is output based on a predictive model that has been trained, and the delay prediction value is compensated for (T2−T1) or (T4−T3) that is output through packet selection, to obtain a compensated timestamp difference. Then, the compensated timestamp difference is sequentially sent to a loop filter and a DDS, to generate a frequency and/or phase adjustment value. Time and/or clock synchronization is performed based on the frequency and/or phase adjustment value to achieve clock and/or time synchronization between the slave clock source device and the master clock source device.

It can be learned from the foregoing process that, because the PDV noise in the timestamp difference is partially compensated for, the timestamp difference more reflects noise of the crystal oscillator, thereby improving synchronization precision of the ACR and/or ATR, and further improving synchronization performance.

Figure 9:
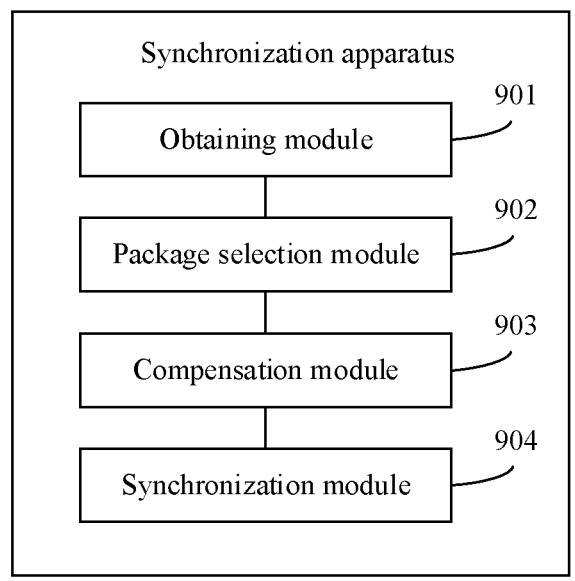
FIG. 9 is a schematic structural diagram of a synchronization apparatus according to an embodiment of the present disclosure.

An embodiment provides a synchronization apparatus. The apparatus may implement the synchronization method shown in FIG. 4 by using the following modules. With reference to FIG. 9, the apparatus includes the following modules.

An obtaining module 901 is configured to obtain a first timestamp difference of a packet on a target link, where the first timestamp difference is a difference between a sending timestamp and a receiving timestamp of the packet at a first moment. For example, the obtaining module 901 may perform the function described in 401 shown in FIG. 4. For details, refer to the related description of 401. Details are not described herein again.

A packet selection module 902 is configured to perform packet selection based on the first timestamp difference to obtain a second timestamp difference. For example, the packet selection module 902 may perform the function described in 402 shown in FIG. 4. For details, refer to the related description of 402. Details are not described herein again.

A compensation module 903 is configured to: obtain a delay prediction value of the target link at the first moment, and compensate for the second timestamp difference based on the delay prediction value to obtain a compensated timestamp difference. For example, the compensation module 903 may perform the functions described in 403 and 404 shown in FIG. 4. For details, refer to the related descriptions of 403 and 404, and details are not described herein again.

A synchronization module 904 is configured to perform time and/or clock synchronization based on the compensated timestamp difference. For example, the synchronization module 904 may perform the function described in 405 shown in FIG. 4. For details, refer to the related description of 405. Details are not described herein again.

In an example embodiment, the obtaining module 901 is configured to predict the delay prediction value of the target link at the first moment based on delay-related data of the target link, where the delay-related data includes at least one of the following data: a delay prediction value or a timestamp difference of the target link at a second moment, where the second moment is earlier than the first moment; and delay-related network parameter data of the target link at the first moment.

In an example embodiment, the obtaining module 901 is configured to obtain a delay prediction value sequence of the target link in a first period, where the delay prediction value sequence includes the delay prediction value of the target link at the first moment.

In an example embodiment, the obtaining module 901 is configured to predict a delay prediction value sequence of the target link in a first period based on a delay prediction value sequence or a timestamp difference sequence of the target link in a second period, where the second period is a period previous to the first period.

In an example embodiment, the obtaining module 901 is configured to predict delay of the target link based on a predictive model to obtain the delay prediction value of the target link at the first moment.

In an example embodiment, the apparatus further includes a training module 905 configured to obtain, based on the target link, delay-related data used to train the predictive model; and perform model training by using the delay-related data, to obtain the predictive model.

In an example embodiment, the delay-related data includes at least one of a timestamp difference sequence and delay-related network parameter data of the target link.

In an example embodiment, the delay-related network parameter data includes at least one of a quantity of target network nodes, traffic transmitted by the target network nodes over the target link, and a corresponding time when a timestamp is added. The target network nodes include a sending device and a receiving device of the packet, and a network device between the sending device and the receiving device.

In an example embodiment, the training module 905 is configured to: in a model training process, use a timestamp difference sequence of the target link in a third period as a sample, and using a timestamp difference sequence of the target link in a fourth period as a label, where the third period is a period previous to the fourth period; in a model training process, use a delay-related network parameter of the target link at a target moment as a sample, and use a timestamp difference of the target link at the target moment as a label; or in a model training process, use a timestamp difference sequence of the target link in a third period and a delay-related network parameter of the target link at a target moment as samples, and use a timestamp difference of the target link at the target moment as a label, where the target moment is a moment next to the third period.

In an example embodiment, the synchronization module 904 is configured to: perform loop filtering on the compensated timestamp difference to obtain a second loop filtering result; perform direct digital frequency synthesis on the second loop filtering result to obtain a second frequency and/or phase adjustment value; and perform time and/or clock synchronization based on the second frequency and/or phase adjustment value.

In an example embodiment, the synchronization module 904 is further configured to: obtain time information obtained by tracing a reference source and detect a phase difference of the time information to obtain a phase difference detection result; perform loop filtering on the phase difference detection result to obtain a first loop filtering result; perform direct digital frequency synthesis on the first loop filtering result to obtain a first frequency and/or phase adjustment value; and perform time and/or clock synchronization based on the first frequency and/or phase adjustment value.

According to the apparatus provided in this embodiment, the delay prediction value of the target link is obtained, and the second timestamp difference obtained through packet selection is compensated for based on the delay prediction value, that is, PDV noise introduced by the target link is compensated for. In this way, the PDV noise is reduced, and the compensated timestamp difference more directly reflects frequency offset and phase offset information of a crystal oscillator relative to a frequency reference source. Therefore, time and/or clock synchronization performed based on the compensated timestamp difference has higher synchronization precision and improved synchronization performance.

Figure 10:
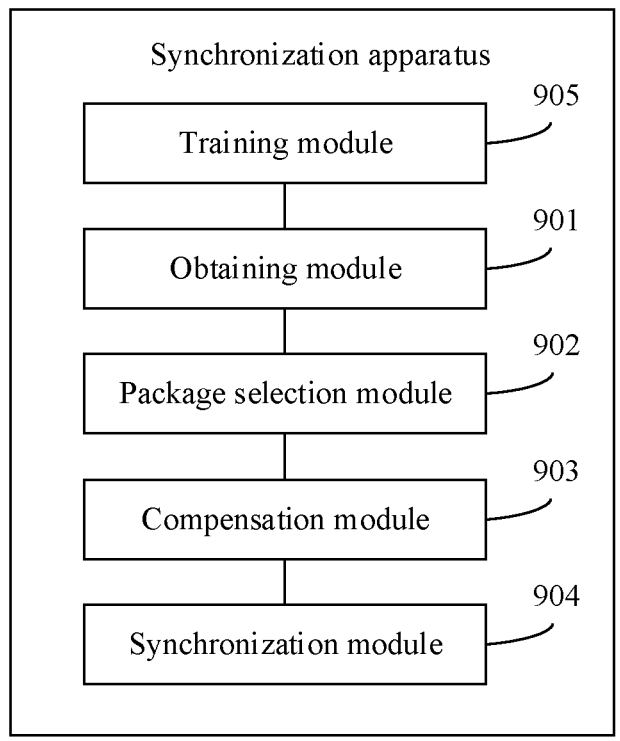
FIG. 10 is a schematic structural diagram of a synchronization apparatus according to an embodiment of the present disclosure.

It should be understood that, when the apparatus provided in FIG. 9 or FIG. 10 implements functions of the apparatus, division into the foregoing functional modules is only used as an example for description. In actual application, the foregoing functions may be allocated to different functional modules for implementation as required. In other words, an internal structure of the apparatus is divided into different functional modules, to implement all or some of the functions described above. In addition, the apparatuses provided in the foregoing embodiments and the synchronization method embodiments belong to a same concept. For a specific implementation process thereof, refer to the synchronization method embodiments. Details are not described herein again.

Figure 11:
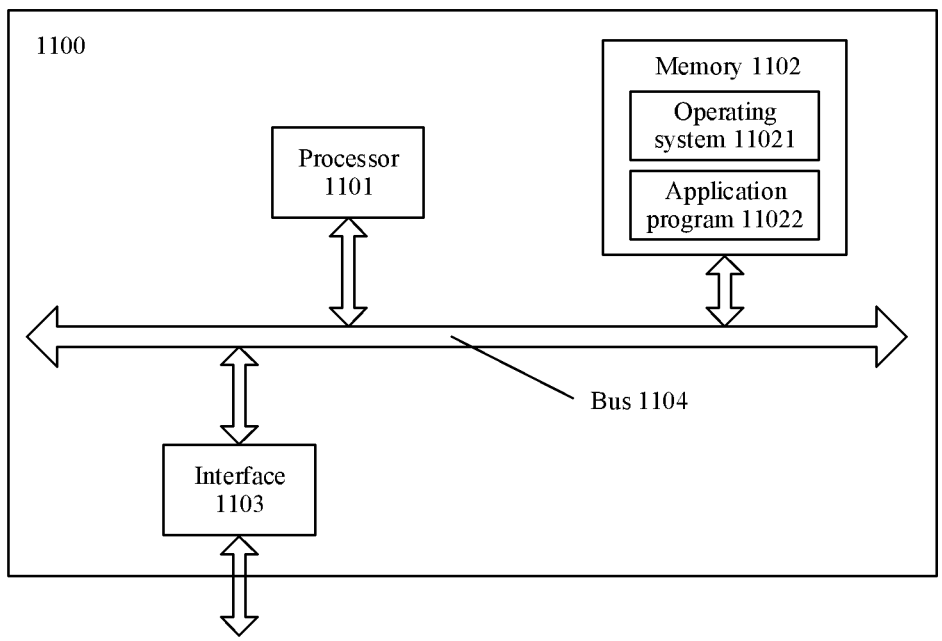
FIG. 11 is a schematic structural diagram of a synchronization device according to an embodiment of the present disclosure.

FIG. 11 is a schematic diagram of a hardware structure of a synchronization device 1100 according to an embodiment. The synchronization device 1100 shown in FIG. 11 may perform corresponding steps performed by the network device in the synchronization method of the foregoing embodiment.

As shown in FIG. 11, the synchronization device 1100 includes a processor 1101, a memory 1102, an interface 1103, and a bus 1104. The interface 1103 may be implemented in a wireless or wired manner, and may be specifically a network adapter. The processor 1101, the memory 1102, and the interface 1103 are connected through the bus 1104.

The interface 1103 may include a transmitter and a receiver, and is configured for the synchronization device 1100 to receive and send a packet. The processor 1101 is configured to perform steps 301 to 305 in the embodiment shown in FIG. 3. The processor 1101 is configured to perform another process of the technology described in this specification. The memory 1102 includes an operating system 11021 and an application program 11022, and is configured to store a program, code, or instructions. When executing the program, the code, or the instructions, the processor or a hardware device may complete a processing process related to the synchronization device 1100 in the synchronization method embodiments. Optionally, the memory 1102 may include a ROM and a random access memory (RAM). The ROM includes a basic input and/or output system (BIOS) or an embedded system. The RAM includes an application program and an operating system. To run the synchronization device 1100, the system boots from the BIOS built in the ROM or a bootloader in the embedded system, and the synchronization device 1100 boots to enter a normal running state. After entering the normal running state, the synchronization device 1100 runs the application program and the operating system in the RAM, so as to complete the processing process related to the synchronization device 1100 in the synchronization method embodiment.

It may be understood that FIG. 11 shows only a simplified design of the synchronization device 1100. In actual application, the synchronization device 1100 may include any quantity of interfaces, processors, or memories.

It should be understood that the processor may be a central processing unit (CPU), or may be another general-purpose processor, a digital signal processor (DSP), an application-specific integrated circuit (ASIC), a field-programmable gate array (FPGA) or another programmable logic device, a discrete gate or a transistor logic device, a discrete hardware component, or the like. The general-purpose processor may be a microprocessor, any conventional processor, or the like. It should be noted that the processor may be a processor that supports an advanced reduced instruction set computing machines (advanced RISC machines, ARM) architecture.

Further, in an optional embodiment, the memory may include a read-only memory and a random access memory, and provide instructions and data for the processor. The memory may further include a non-volatile random access memory. For example, the memory may further store information about a device type.

The memory may be a volatile memory or a non-volatile memory, or may include both a volatile memory and a non-volatile memory. The non-volatile memory may be a ROM, a programmable ROM (PROM), an erasable programmable ROM (EPROM), an electrically erasable programmable ROM (EEPROM), or a flash memory. The volatile memory may be a RAM that is used as an external buffer. By way of example but not limitation, many forms of RAMs may be used, for example, a static RAM (SRAM), a dynamic RAM (DRAM), a synchronous dynamic RAM (SDRAM), a double data rate synchronous dynamic RAM (DDR SDRAM), an enhanced synchronous dynamic RAM (ESDRAM), a synchlink dynamic RAM (SLDRAM), and a direct rambus RAM (DR RAM).

A computer-readable storage medium is further provided. The storage medium stores at least one instruction, and the instruction is loaded and executed by a processor to implement any one of the foregoing synchronization methods.

This application provides a computer program. When the computer program is executed by a computer, a processor or the computer is enabled to perform corresponding steps and/or procedures in the foregoing method embodiments.

A chip is provided. The chip includes a processor configured to invoke, from a memory, instructions stored in the memory and run the instructions, so that a communication device on which the chip is installed performs the synchronization methods in the foregoing aspects.

Another chip is provided. The chip includes an input interface, an output interface, a processor, and a memory. The input interface, the output interface, the processor, and the memory are connected through an internal connection path. The processor is configured to execute code in the memory. When the code is executed, the processor is configured to perform the synchronization methods in the foregoing aspects.

All or some of the foregoing embodiments may be implemented by software, hardware, firmware, or any combination thereof. When software is used to implement embodiments, all or some of the embodiments may be implemented in a form of a computer program product. The computer program product includes one or more computer instructions. When the computer program instructions are loaded and executed on a computer, all or some of the procedures or functions in this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial optical cable, an optical fiber, or a digital subscriber line) or wireless (for example, infrared, radio, microwave, or the like) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a Digital Video Disc (DVD)), or a semiconductor medium (for example, a solid-state drive).

In the foregoing specific implementations, the objectives, technical solutions, and beneficial effects of this application are further described in detail. It should be understood that the foregoing descriptions are merely specific implementations of this application, but are not intended to limit the protection scope of this application. Any modification, equivalent replacement, improvement, or the like made based on the technical solutions of this application shall fall within the protection scope of this application.

What is claimed is:

1. A synchronization method comprising:
   obtaining a first timestamp difference of a packet on a target link, wherein the first timestamp difference is a difference between a sending timestamp and a receiving timestamp of the packet at a first moment;
   performing packet selection based on the first timestamp difference to obtain a second timestamp difference;
   obtaining a delay prediction value of the target link at the first moment;
   compensating for the second timestamp difference based on the delay prediction value to obtain a compensated timestamp difference; and
   performing time or clock synchronization based on the compensated timestamp difference.

2. The synchronization method of claim 1, wherein performing time or clock synchronization based on the compensated timestamp difference comprises:
   performing loop filtering on the compensated timestamp difference to obtain a second loop filtering result;
   performing direct digital frequency synthesis on the second loop filtering result to obtain a second frequency or phase adjustment value; and
   performing time or clock synchronization based on the second frequency or phase adjustment value.

3. The synchronization method of claim 1, wherein obtaining the delay prediction value of the target link at the first moment comprises obtaining a delay prediction value sequence of the target link in a first period, and wherein the delay prediction value sequence comprises the delay prediction value of the target link at the first moment.

4. The synchronization method of claim 3, wherein obtaining the delay prediction value sequence of the target link in a first period comprises predicting the delay prediction value sequence of the target link in the first period based on a delay prediction value sequence or a timestamp difference sequence of the target link in a second period, and wherein the second period is a period previous to the first period.

5. The synchronization method of claim 1, wherein obtaining the delay prediction value of the target link at the first moment comprises predicting a delay of the target link based on a predictive model to obtain the delay prediction value of the target link at the first moment.

6. The synchronization method of claim 5, wherein prior to predicting the delay of the target link based on the predictive model, the synchronization method further comprises:
  obtaining, based on the target link, delay-related data for training the predictive model; and
  performing model training by using the delay-related data to obtain the predictive model.

7. The synchronization method of claim 6, wherein performing model training by using the delay-related data to obtain the predictive model in a model training process comprises:
  using a timestamp difference sequence of the target link in a third period as a sample, and using a timestamp difference sequence of the target link in a fourth period as a label, wherein the third period is a period previous to the fourth period;
  using a delay-related network parameter of the target link at a target moment as a sample, and using a timestamp difference of the target link at the target moment as a label; or
  using a timestamp difference sequence of the target link in a third period and a delay-related network parameter of the target link at a target moment as samples, and using a timestamp difference of the target link at the target moment as a label, wherein the target moment is a moment next to the third period.

8. The synchronization method of claim 7, wherein obtaining the delay prediction value of the target link at the first moment comprises predicting the delay prediction value of the target link at the first moment based on delay-related data of the target link, wherein the delay-related data comprises at least one of the following data:
  a delay prediction value or a timestamp difference of the target link at a second moment, wherein the second moment is earlier than the first moment; or
  delay-related network parameter data of the target link at the first moment.

9. The synchronization method of claim 8, wherein when the delay-related data is obtained in an online manner, prior to obtaining the delay-related data, the synchronization method further comprises:
  obtaining time information obtained by tracing a reference source, and detecting a phase difference of the time information to obtain a phase difference detection result;
  performing loop filtering on the phase difference detection result to obtain a first loop filtering result;
  performing direct digital frequency synthesis on the first loop filtering result to obtain a first frequency or phase adjustment value; and
  performing time or clock synchronization based on the first frequency or phase adjustment value.

10. The synchronization method of claim 8, wherein the delay-related data comprise at least one of a timestamp difference sequence or delay-related network parameter data of the target link.

11. The synchronization method of claim 10, wherein the delay-related network parameter comprises at least one of a quantity of target network nodes, traffic transmitted by the target network nodes over the target link, or a corresponding time when a timestamp is added, and wherein the target network nodes comprise a sending device of the packet, a receiving device of the packet, and a network device between the sending device and the receiving device.

12. A synchronization apparatus comprising a memory and a processor configured to:
  obtain a first timestamp difference of a packet on a target link, wherein the first timestamp difference is a difference between a sending timestamp and a receiving timestamp of the packet at a first moment;
  perform packet selection based on the first timestamp difference to obtain a second timestamp difference;
  obtain a delay prediction value of the target link at the first moment, and compensate for the second timestamp difference based on the delay prediction value to obtain a compensated timestamp difference; and
  perform time or clock synchronization based on the compensated timestamp difference.

13. The synchronization apparatus of claim 12, further configured to obtain a delay prediction value sequence of the target link in a first period, wherein the delay prediction value sequence comprises the delay prediction value of the target link at the first moment.

14. The synchronization apparatus of claim 12, further configured to predict a delay prediction value sequence of the target link in a first period based on a delay prediction value sequence or a timestamp difference sequence of the target link in a second period, wherein the second period is a period previous to the first period.

15. The synchronization apparatus of claim 12, further configured to predict delay of the target link based on a predictive model to obtain the delay prediction value of the target link at the first moment.

16. The synchronization apparatus of claim 15, further configured to:
  obtain, based on the target link, delay-related data used to train the predictive model; and
  perform model training by using the delay-related data, to obtain the predictive model.

17. The synchronization apparatus of claim 12, further configured to predict the delay prediction value of the target link at the first moment based on delay-related data of the target link, wherein the delay-related data comprises at least one of the following data:
  a delay prediction value or a timestamp difference of the target link at a second moment, wherein the second moment is earlier than the first moment; and
  delay-related network parameter data of the target link at the first moment.

18. The synchronization apparatus of claim 17, wherein the delay-related data comprises at least one of a timestamp difference sequence and delay-related network parameter data of the target link.

19. The synchronization apparatus of claim 18, wherein the delay-related network parameter data comprises at least one of a quantity of target network nodes, traffic transmitted by the target network nodes over the target link, and a corresponding time when a timestamp is added, and wherein the target network nodes comprise a sending device and a receiving device of the packet, and a network device between the sending device and the receiving device.

20. A computer program product comprising instructions that are stored on a non-transitory computer-readable medium and that, when executed by a processor, cause a synchronization apparatus to:
- obtain a first timestamp difference of a packet on a target link, wherein the first timestamp difference is a difference between a sending timestamp and a receiving timestamp of the packet at a first moment;
- perform packet selection based on the first timestamp difference to obtain a second timestamp difference;
- obtain a delay prediction value of the target link at the first moment, and compensating for the second timestamp difference based on the delay prediction value to obtain a compensated timestamp difference; and
- perform time or clock synchronization based on the compensated timestamp difference.

* * * * *